US007406369B2

(12) United States Patent
Greene

(10) Patent No.: US 7,406,369 B2
(45) Date of Patent: Jul. 29, 2008

(54) GROUND EFFECTS COMPENSATED ANGLE OF ATTACK COMMAND SYSTEM AND METHOD

(76) Inventor: Leonard M. Greene, 1010 Greacen Rd., Mamaroneck, NY (US) 10543

( * ) Notice: Subject to any disclaimer, the term of this patent is extended or adjusted under 35 U.S.C. 154(b) by 103 days.

(21) Appl. No.: 11/107,810

(22) Filed: Apr. 18, 2005

(65) Prior Publication Data

US 2006/0235582 A1 Oct. 19, 2006

(51) Int. Cl.
*G05D 1/06* (2006.01)

(52) U.S. Cl. .............................. 701/6; 701/15; 701/16; 244/181; 73/178 T

(58) Field of Classification Search .................... 701/5, 701/6, 8, 13, 15, 16; 244/181, 184; 73/178 T; 340/970
See application file for complete search history.

(56) References Cited

U.S. PATENT DOCUMENTS 3,691,356 A * 9/1972 Miller ........................ 701/15
5,089,968 A * 2/1992 Orgun et al. .................. 701/6
5,136,518 A * 8/1992 Glover ......................... 701/5

* cited by examiner

*Primary Examiner*—Gertrude A. Jeanglaude
(74) *Attorney, Agent, or Firm*—Lowe Hauptman Ham & Berner, LLP

(57) ABSTRACT

A take off ground effects compensated angle of attack system includes a radio altimeter and/or timer, a pitch angle system and a flight control computer. The radio altimeter generates a signal which is indicative of the aircraft's altitude from 0 i.e., weight off wheels to an altitude of ½ the wing span of the aircraft. The angle of attack system simultaneously generates a signal which is indicative of the aircraft's angle of attack without compensation for ground effects. Therefore, a ground effects signal of from 1½° to 0° is generated and added to the angle of attack signal as the aircraft climbs from 0 ft. to an altitude which is equal to ½ the wing span of the aircraft. The ground effects signal is added to the angle of attack signal to provide a ground effects compensated angle of attacks signal which is then fed to the flight control computer or display.

8 Claims, 2 Drawing Sheets

SINE PITCH
LONGITUDINAL ACCEL
FLAP POSITION
FLAP BIAS
AOA
RA
GROUND EFFECT BIAS
PITCH
LIMITER
PITCH CMD
K1
K2
22
24
26
28
30
32
34
36
38
40
42
44
46
50
52
54
56
20

GROUND EFFECTS COMPENSATED ANGLE OF ATTACK COMMAND SYSTEM AND METHOD

FIELD OF THE INVENTION

This invention relates to a method and system for generating a ground effects compensated angle of attack signal during a takeoff of an aircraft and more particularly to an angle of attack command system that is compensated for ground effects during a period from weight off wheels until an altitude which is equal to about one half the wing span of the aircraft.

BACKGROUND FOR THE INVENTION

A method for generating a ground effect compensated aircraft body angle of attack signal is disclosed in the U.S. Pat. No. 5,089,968 of Orgun et al. As disclosed therein, the method includes converting an aircraft pitch rate correction alpha vane signal to a free air body angle of attack signal that is collaborated to the type of aircraft that employs the method for the two conventional landing flap settings. The free air body angle and attack signal is processed to obtain an alpha vane correction signal that represents ground effects compensation that would be required at zero altitude (touchdown). The zero altitude alpha vane correction signal is then multiplied by an altitude scaling signal and converted to a ground effect compensation signal that is applicable to the then current altitude of the aircraft. The ground effects compensation signal is summed with the free air corrected body angle of attack signal to provide the ground effect compensation angle of attack signal to provide the ground effect compensated body angle of attack signal of the patented device.

It is well known that the coefficient of lift increases with increases in angle of attack over a given range. However, if the angle of attack is increased beyond a given point, the lift coefficient is reduced. In such cases, the aircraft may become unstable or stall. It has also been recognized that aircraft during takeoff and climb out maneuvers are flown at relatively high angles of attack in order to maintain the proper lift force. However, in order to avoid unsafe conditions, a safety margin is provided for angle of attack and the aircraft is operated at less than its maximum performance characteristics.

It is now believed that there may be a large commercial market for a ground effects compensated angle of attack system that will allow a pilot to operate an aircraft at or near its maximum performance characteristics during takeoff i.e., during the first fifty or so feet of altitude. There should be a demand for such systems because they result in more efficient operation of the aircraft, ability to accommodate changing conditions and avoid obstacles. It is presently believed that the use of a ground effects compensated angle of attack method and system are particularly important during a takeoff maneuver when an aircraft is at its maximum loading.

Further, the ground effects compensated angle of attack system in accordance with the present invention can be manufactured and sold at a competitive cost, are reliable, durable and readily installed and serviced on an aircraft. Such system may also be readily added or retrofitted to many aircraft.

BRIEF SUMMARY OF THE INVENTION

In essence, the present invention contemplates a ground effects compensation system for generating a compensated angle of attack target during a takeoff of an aircraft. The system includes a flight control indicator system or computer and an altimeter. The system also includes means for generating a signal indicative of the aircraft's angle of attack. Means for sensing the weight off wheels in an aircraft as an aircraft leaves the ground and for generating a signal indicative thereof may be provided. The system also comprises means including the altimeter for generating a signal indicative of the altitude of the aircraft from weight off wheels to an altitude which is equal to about one half the wing span of the aircraft. In addition, the system includes means for generating a ground effects compensated signal representative of the ground effects between an altitude from zero to about one half the wing span of the aircraft and means for combining the signal indicative of the aircraft's angle of attack and the ground effects compensation signal to thereby provide a ground effects compensated angle of attack signal. In a preferred embodiment of the invention the compensated angle of attack system is inputted into a flight control computer, or command signal.

The invention also contemplates a method for generating a ground effects compensated angle of attack signal during the takeoff of an aircraft.

The invention will now be described in connection with the accompanying drawings wherein like numerals have been used to designate like parts.

DESCRIPTION OF THE PREFERRED EMBODIMENTS OF THE INVENTION

Figure 1:
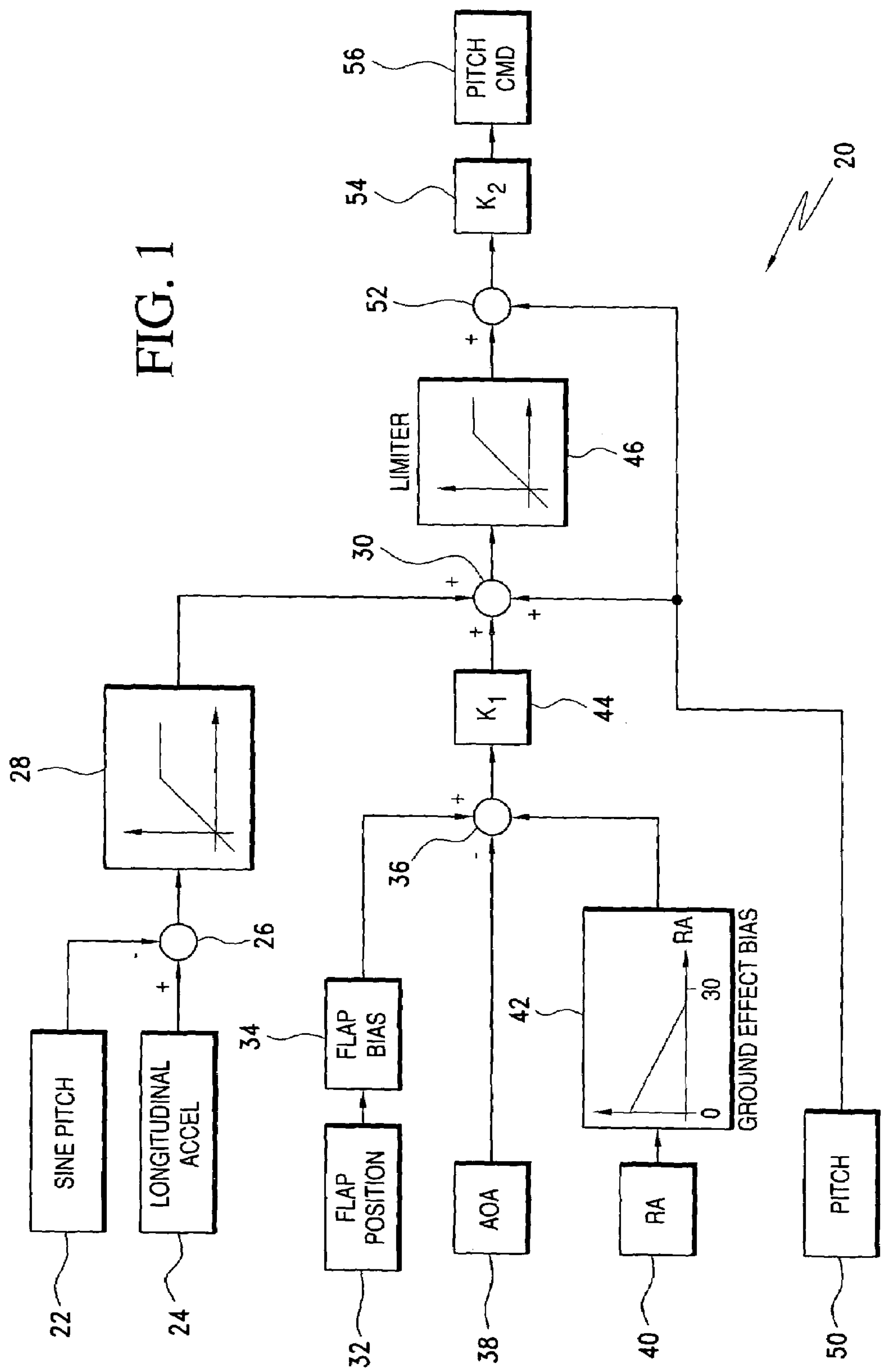
FIG. 1 is a functional block diagram illustrating the basic aspects of a first embodiment of the invention.

A ground effects compensation system for generating a compensated angle of attack system or command during a take-off of an aircraft is illustrated in FIG. 1. As illustrated, the ground effects compensation system is incorporated in a speed command system. One example of part of such system is disclosed in my earlier U.S. Pat. No. 4,520,060 which is incorporated herein in its entirety by reference.

Referring to FIG. 1, a speed command system 20 which includes a ground effects compensation system also includes conventional means 22 for generating a signal indicative of the sine of the pitch angle of the aircraft and a conventional longitudinal accelerometer 24. Signals generated by the means 22 and longitudinal accelerometer 24 are fed to a summing junction 26, the output of which is fed to a positive limiter circuit 28. The positive limiter circuit 28 restricts the acceleration output to avoid approaching a stall.

A flap position sensor 32 sends a signal to a flap bias circuit 34 generating a signal which is fed to a third summing junction 36 in a conventional manner. The signal from the flap bias circuit 34 is compared against an angle of attack signal from an angle of attack vane 38 or the like. As indicated, a signal from the angle of attack vane 38 is fed to the summing junction 36 and is subtracted from the flap bias signal thereby.

The system 20 also includes a radio altimeter 40 which feeds a signal indicative of the aircraft's altitude from 0 to about 30 to 50 feet to a ground effects bias circuit 42. The ground effects bias circuit 42 provides a signal of 0° to 1½° as the aircraft leaves the ground and until the aircraft reaches an altitude equal to about ½ of its wing span.

During take-off, a correction of 1½° is applied as the aircraft leaves the ground. This correction then decreases to 0° when the aircraft reaches an altitude of about ½ of its wing span. The ground effects bias signal is fed to the summing junction 36 and added to the flap bias and angle of attack signals. The output of the summing junction 36 is then multiplied by a first constant 44 to produce a signal which is fed to the summing junction 30.

A signal indicative of the pitch angle of the aircraft is generated by conventional means 50 and fed to the summing junction 30 wherein it is added to the signals from the limiter 28 and constant 44. The pitch signal is also fed to a fourth summing junction 52 and is subtracted from the signal from a limiter 46. A signal from the fourth summing junction 52 is then multiplied by a second constant 54 and fed to a pitch command 56.

In this way if the output of the summing junction 30 exceeds the output of the limiter 46 the pitch signal entering the junction 52 will result in a negative value. This negative value will result in a signal to lower the nose of the aircraft.

Figure 2:
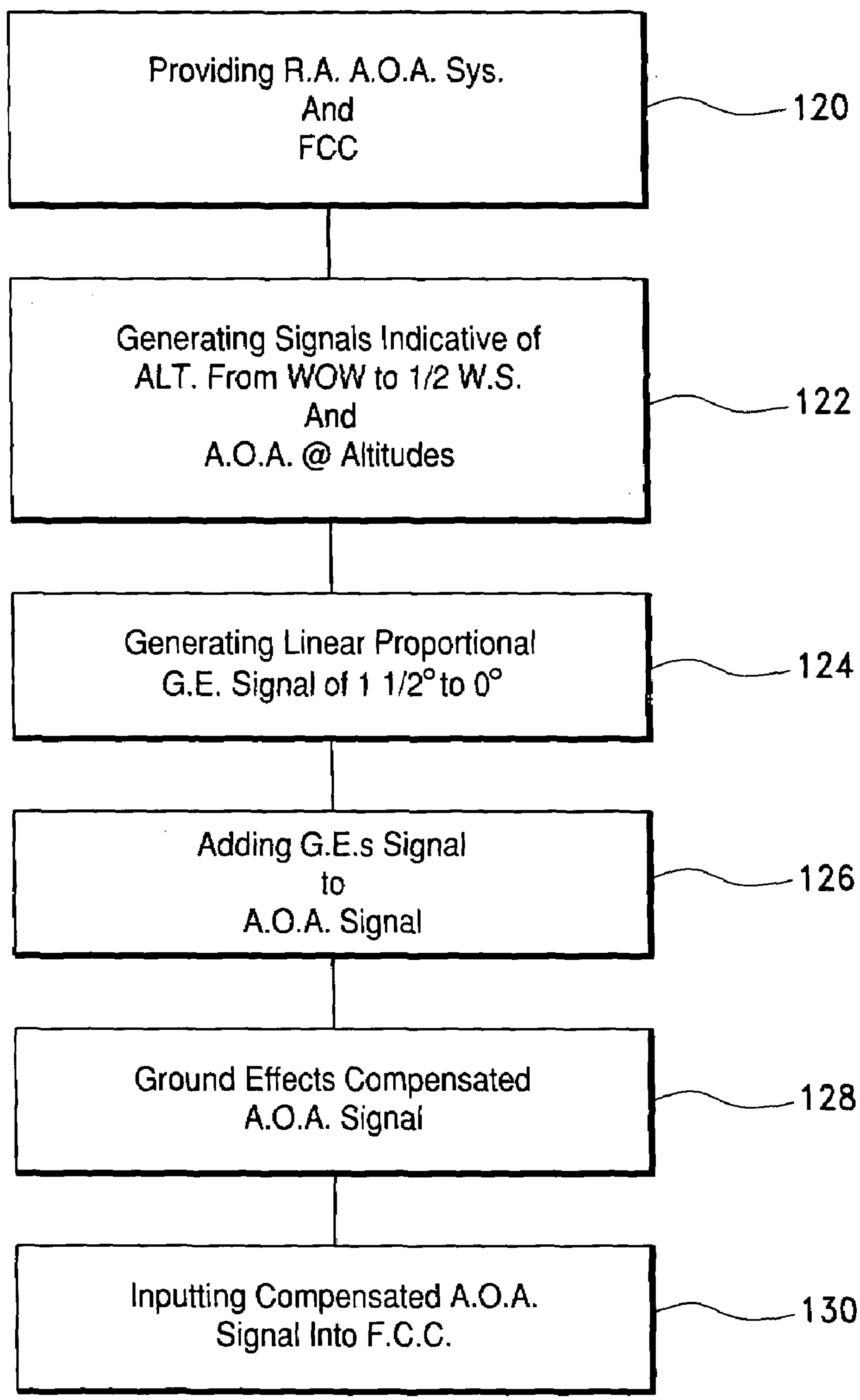
FIG. 2 is a flow chart which illustrates a method for generating a ground effects compensated angle of attack signal during the takeoff of an aircraft in accordance with a second embodiment of the invention.

The invention also contemplates a method for generating a ground effects compensated angle of attack signal during a takeoff of an aircraft. This method allows a pilot to fly an aircraft at or near its maximum performance characteristics during its first fifty or so feet above the ground. As illustrated in FIG. 2, the method includes the step 120 of providing a radio altimeter, an angle of attack system and longitudinal acceleration computer. A signal, indicative of altitude is generated by the radio altimeter for altitudes from the weight off wheels or zero to an altitude which is equal to one half the wing span of the aircraft in step 122. At the same time, the angle of attack system which includes an angle of attack vane generates an angle of attack signal which is indicative of the aircraft's body angle of attack.

The method according to one preferred embodiment of the invention also includes the step 124 of generating a linear proportional ground effect signal of between 1½° to zero degrees as the aircraft climbs from the weight off wheels to an altitude which is equal to or about equal to one half the wing span of the aircraft. The straight line function is illustrated in FIG. 1 by the graph shown in the bias circuit 42 wherein the abscissa indicates the degrees of compensation i.e., 0° to 1½° and the ordinate indicates altitude from 0 ft. to ½ the wing span of the aircraft. It is recognized that the actual ground effects are not a straight line function. However, the straight line has been used as a reasonably close approximation.

In step 126, the ground effects signal is added to the angle of attack signal to produce a ground effects compensated angle of attack signal as indicated at 128. Finally, the ground effects compensated angle of attacks signal is input into the flight control computer or system in step 130.

While the invention has been described in connection with its preferred embodiments, it should be recognized that changes and modifications may be made therein without departing from the scope of the appended claims.

The invention claimed is:

1. A ground effects compensation system for generating a compensated angle of attack signal during a takeoff of an aircraft, said system comprising a flight control system, an altimeter and means for indicating the angle of attack of an aircraft and for generating a signal indicative of the aircrafts angle of attack;

means including said altimeter for generating a signal indicative of the aircrafts altitude upon achieving the weight off wheels and until said aircraft reaches an altitude equal to about ½ of the wing span of the aircraft;

means for generating a linear proportional ground effects compensation signal of between 1½° to 0° as the aircraft climbs from the weight off wheels to an altitude which is equal to about ½ the wing span of the aircraft; and means for combining the signal indicative of the aircraft's angle of attack and the linear proportional ground effects compensation signal to thereby provide a ground effects compensated angle of attack signal.

2. A ground effects compensation system for generating a compensated angle of attacks signal during a takeoff of an aircraft according to claim 1 which includes sensing means for sensing the weight off wheels of an aircraft as the aircraft leaves the ground and for generating a signal indicative of the weight off wheels.

3. A ground effects compensation system for generating a compensated angle of attacks signal during a takeoff of an aircraft according to claim 1 which includes means for inputting said ground effects compensated angle of attack signal into said flight control computer.

4. A ground effects compensation system for generating a compensated angle of attacks signal during a takeoff of an aircraft according to claim 3 in which said altimeter is a radio altimeter.

5. A ground effects compensation system for generating a compensated angle of attacks signal during a takeoff of an aircraft according to claim 1 in which said means for indicating the aircraft's angle of attack includes an angle of attack vane.

6. A method for generating a ground effects compensated angle of attacks signal during a takeoff of an aircraft comprising the steps of:

providing a radio altimeter and an angle of attack vane for generating signals indicative of an aircraft's altitude and angle of attack at indicated altitudes from weight off wheels to an altitude of about ½ the wing span of the aircraft;

generating a linear proportional ground effects compensation signal of between 1½° to 0° as the aircraft climbs from the weight off wheels to an altitude which is equal to about ½ the wing span of the aircraft; and adding the linear proportional ground effects compensation signal to the angle of attack signal for altitudes between weight off wheels and an altitude which is equal to about ½ the wing span of the aircraft.

7. A method for generating a ground effects compensated angle of attacks signal during a takeoff of an aircraft comprising the steps of:

providing a radio altimeter and an angle of attack vane for generating signals indicative of an aircraft's altitude and angle of attack;

sensing the weight off wheels during the takeoff of the aircraft;

generating a signal indicative of the aircraft's altitude and angle of attack at indicated altitudes between weight off wheels and an altitude of about ½ the wing span of the aircraft;

generating a ground effects compensation signal representative of ground effects between weight off wheels and an altitude which is equal to about ½ the wing span of the aircraft; and combining the signals indicative of the aircraft's angle of attack and the ground effects compensation signal to thereby provide a ground effect compensated angle of attack system.

8. A method for generating a ground effects compensated angle of attack signal during a takeoff of an aircraft in accordance with claim 7 which includes the step of providing a flight control system and inputting the ground effects compensated angle of attack signal into the flight control system.

* * * * *